US005187571A

United States Patent [19]
Braun et al.

[11] Patent Number: 5,187,571
[45] Date of Patent: Feb. 16, 1993

[54] TELEVISION SYSTEM FOR DISPLAYING MULTIPLE VIEWS OF A REMOTE LOCATION

[75] Inventors: David A. Braun, Denville; William A. E. Nilson, III, Bridgewater; Terence J. Nelson, New Providence; Lanny S. Smoot, Morris Township, Morris County, all of N.J.

[73] Assignee: Bell Communications Research, Inc., Livingston, N.J.

[21] Appl. No.: 649,025

[22] Filed: Feb. 1, 1991

[51] Int. Cl.⁵ ............................................. H04N 7/14
[52] U.S. Cl. ..................................... 358/85; 358/87; 358/93; 358/181
[58] Field of Search ................. 358/181, 185, 225, 85, 358/86, 87, 93, 103, 104, 108; 455/3, 5, 6; 379/53, 54; 354/94, 95; 352/69, 70, 133; 359/403, 419

[56] References Cited
U.S. PATENT DOCUMENTS 3,697,678 10/1972 Belleson ............................. 340/709
4,355,328 10/1982 Kulik .................................. 358/183
4,400,727 8/1983 Aron .................................. 358/103
4,613,898 9/1986 Bagnall-Wild ....................... 358/87
4,797,942 1/1989 Burt ..................................... 358/87
4,870,314 12/1989 Judd .................................... 358/87
5,023,725 6/1991 McCutchen ........................ 358/93

FOREIGN PATENT DOCUMENTS 0194788 8/1990 Japan .

Primary Examiner—James J. Groody
Assistant Examiner—Sherrie Hsia
Attorney, Agent, or Firm—Leonard Charles Suchyta; Loria J. Baskerville

[57] ABSTRACT

A television system (100) comprises a sending station (70), a composing system (80) and a receiving station (90). The sending station (70) comprise a sequence of cameras (1,2,3, . . . ,N) arranged so that the fields of view merge contiguously to form an aggregate field of view. The composing station (80) includes circuitry which enables a local viewer at the receiving station (90) to select an arbitrary and continuously variable subsection of the aggregate field of view for display on a local monitor (200).

17 Claims, 5 Drawing Sheets

5,187,571

TELEVISION SYSTEM FOR DISPLAYING MULTIPLE VIEWS OF A REMOTE LOCATION

FIELD OF THE INVENTION

The present invention relates to a television system including a plurality of cameras located at a remote location and having individual fields of view which merge contiguously with one another to form an aggregate wide angle field of view. One or more display systems in communication with the plurality of remotely located cameras enables each of one or more local viewers to select an independent and arbitrary section of the aggregate field of view for display on a local monitor. The inventive system is especially useful in teleconferencing applications.

BACKGROUND OF THE INVENTION

Since the beginning of wire, and later wireless, communications, an implicit goal of communications systems has always been to bring remotely located participants as close together as possible. This is also the goal of a traditional teleconferencing system. Ideally, the effect obtained in good communications should be one of "being there."

A conventional teleconferencing system comprises two or more stations which are illustratively connected via the public switched telephone network. At each station, there is a camera for transmitting a video image to a remote station. There is also a microphone for picking up sound and forming an audio signal for transmission to the remote station. The typical teleconferencing station also includes a video monitor for receiving a video signal from the remote station to produce an image of a conferee at the remote station and a speaker for receiving an audio signal from the remote station.

In most teleconferencing systems, the video camera at a sending station is an NTSC camera which has a limited field of view. This camera forms an image on a conventional NTSC monitor at a receiving station remotely located relative to the sending station. One problem with this arrangement is that the conventional NTSC monitor is relatively small-sized. When the number of teleconference participants at the sending-end of a teleconference is larger than one, the image of each participant occupies a small portion of a small viewing area on the receiving monitor. As a result it becomes difficult for viewers at the receiving end of such an image to pick up non-verbal cues from the speaker's body and face. Indeed, in many cases it is often difficult to discern at the receiving-end who of the many participants at the sending-end is actually speaking.

U.S. Pat. 4,890,314 discloses a teleconferencing station which solves one aspect of this problem. In particular, in accordance with U.S. Pat. 4,890,314, a transmitting teleconferencing station includes, for example, first and second cameras which are specially arranged to have contiguous fields of view over a range of distances from the cameras. The two cameras produce first and second video signals corresponding to first and second sub-images. At the receiving teleconferencing station, the two sub-images are displayed using a unique display device so that the two sub-images merge contiguously to form a single high resolution image. The cameras at the transmitting station collectively have a larger field of view than a single camera would have, and, at the receiving-end, a much larger image is formed than would be the case if a conventional NTSC monitor were to be utilized.

Another problem associated with the conventional teleconferencing station is that a teleconference participant has no control over the view of a remote location that is displayed on the local monitor. Typically, at a sending teleconferencing station, whether the imaging device is a single NTSC camera or a combination of cameras as described in U.S. Pat. No. 4,890,314, there is a fixed field of view which is transmitted to a receiving participant. The receiving participant only sees whatever object or persons happen to be in the fixed field of view. Of course, a remote camera can be gimbal mounted and controlled by the viewer. However, in this case, there can only be a single locally available view of the remote station so that each of a plurality of viewers cannot choose their own view of the remote station.

Accordingly, it is an object of the present invention to provide a television system which provides a local viewer with a locally controllable view of a remote location. In particular, it is an object of the present invention to provide a system in which a local viewer can select an arbitrary and continuously variable section of a remote wide angle field of view for display on a local monitor.

It is a further object of the invention to provide a television system in which a plurality of viewers at different locations can each select his/her own view of a remote location. Specifically, it is an object of the invention to provide a television system in which each of a plurality of viewers can choose his/her own section of a remote wide angle field of view for display on his/her own monitor.

The inventive television system is especially useful in teleconferencing applications.

SUMMARY OF THE INVENTION

In accordance with an illustrative embodiment of the present invention, a television system comprises a sequence of cameras, such as NTSC cameras, located at a remote location. The cameras are arranged so that their fields of view merge contiguously to form an aggregate wide angle field of view. The cameras are synchronized so that a horizontal line of displayable video in one camera ends just at the start of a horizontal line of displayable video of the next camera in the sequence.

A local viewer has the capability of selecting an arbitrary and continuously variable section of the aggregate wide angle field of view for display on a local monitor. The arbitrarily chosen section of the overall field of view at the remote location is preferably equal in angular width to the field of view of an individual NTSC camera so that the arbitrarily chosen section of the remote field of view can be displayed on an NTSC monitor. In this case, the arbitrarily chosen section of the aggregate wide angle field of view comprises portions of the individual fields of view of at most two adjacent cameras from the sequence of remotely located cameras.

To form a composite video signal for display on the local monitor of a user, the inventive television system comprises a multiplexer which multiplexes together portions of the video signals from first and second adjacent cameras selected by the viewer and a black burst from a video sync generator. The black burst includes everything that goes into a video signal such as horizontal and vertical synchronization signals except the video information itself. The purpose of the multiplexer is to combine the black burst with a portion of the video information from each of the first and second selected cameras to form a composite video signal for display on the local monitor of the viewer. In particular, in addition to selecting the first and second cameras, the viewer controls the timing of the black burst signal relative to a line of video in the signal of the first selected camera. Therefore, a line of video in the composite signal includes the portion of a line of video from the first selected camera which starts at the end of the horizontal blanking interval of the black burst and which ends at the start of the next horizontal blanking interval of the video signal of the first selected camera. The line of video in the composite signal continues with a portion of a line of video from the second selected camera which ends at the start of the next horizontal blanking interval of the black burst. This is possible because as indicated above, the two selected adjacent cameras are synchronized so that a line of displayable video of the first camera ends just when a line of displayable video of the second camera begins.

Accordingly, a viewer, such as a teleconference participant, can arbitrarily choose a desired field of view of a remote location to display on a local monitor. In particular, a viewer can control the displayed field of view by controlling the selection of up to two remotely located cameras out of a sequence of remotely located cameras and by controlling the relative portions of the video signal from the two selected cameras which are combined to form a composite video signal displayed on the local monitor.

It should be noted that the composing circuitry for forming the composite video signal may be located at the transmitting-end along with the cameras, or at the receiving-end. Alternatively, the circuitry for forming the composite video image may be located at a location separate from the transmitting-end and the receiving-end, such as for example a central office of a telephone network. It is a significant advantage of the invention that the video signals produced by the sequence of cameras can be utilized by a plurality of viewers to form individual composite video signals so that each individual viewer can choose his/her own section of the aggregate field of view for display on his/her own monitor.

DETAILED DESCRIPTION OF THE INVENTION

The detailed description of the invention is divided into two sections. Section A describes arrangements of sequences of cameras in which the cameras have contiguous fields of view that merge together to form an aggregate wide angle field of view. Section B describes a television system which enables a viewer to select a section of the aggregate field of view for display on a local monitor.

A. Optical Arrangement

Figure 1:
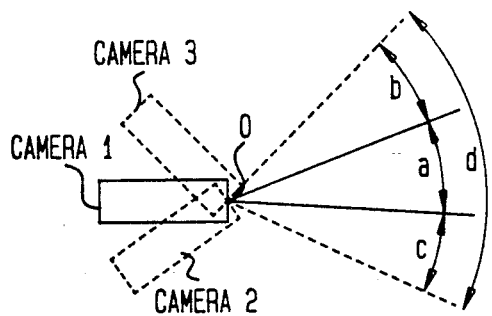
FIG. 1 schematically illustrates the difficulty in arranging a sequence of cameras with contiguous fields of view.

FIG. 1 schematically illustrates the difficulty in arranging a plurality of video cameras to have contiguous fields of view. In FIG. 1, the field of view of video camera 1 is labeled a, the field of view of video camera 2 is labeled b, and the field of view of video camera 3 is labeled c. The fields of view of the three cameras are contiguous over a range of distances from the cameras and merge together to form an aggregate field of view labeled d. However, in order for the fields of view a, b, c to be contiguous, the corresponding cameras 1, 2, 3 must all be located at the common vertex 0 of the three fields of view. As shown in FIG. 1, this is physically impossible, since it is not possible for all three cameras to occupy the same position in space. Thus, to achieve contiguous fields of view, it is not possible to simply place a sequence of cameras one next to the other.

Figure 2:
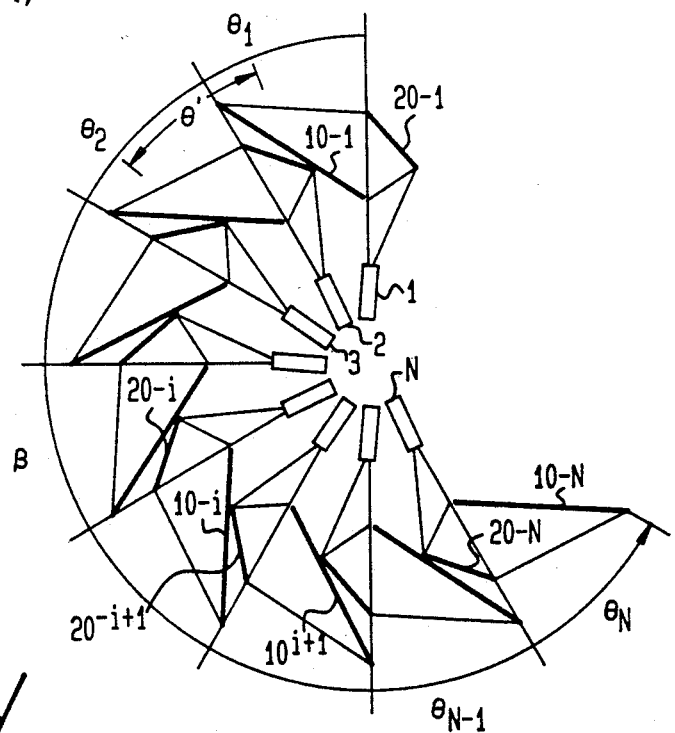
FIG. 2 illustrates an optical system comprising a sequence of cameras and associated mirrors arranged so that the cameras have contiguous fields of view, in accordance with the present invention.

FIG. 2 illustrates a physically realizable arrangement of cameras and mirrors where the cameras and mirrors are positioned so that the fields of view of adjacent cameras merge contiguously to form an aggregate wide angle field of view. FIG. 2 illustrates a plurality of cameras i, i=1,2,3, . . . ,N. In FIG. 2, N=8 so that there is a sequence of eight cameras illustrated in FIG. 2. The field of view of each camera 1,,2. . . ,N, is labeled $\theta_1$, $\theta_2$, . . . ,$\theta_N$, respectively. The field of view of each camera in FIG. 2 merges continuously with the fields of view of adjacent cameras so that the fields of view $\theta_1$, $\theta_2$, . . . ,$\theta_N$ are aggregated together to form an aggregate wide angle field of view $\beta$.

Associated with each camera i in FIG. 2 are the mirrors 10-i and 20-i. Thus, associated with the camera 1 are the mirrors 10-1 and 20-1 and associated with the camera N are the mirrors 10-N and 20-N. The mirrors 10-i and 20-i associated with each camera i fold the optical rays comprising the field of view of each camera so that there is enough room to mount actual cameras at the common vertex.

Figure 3:
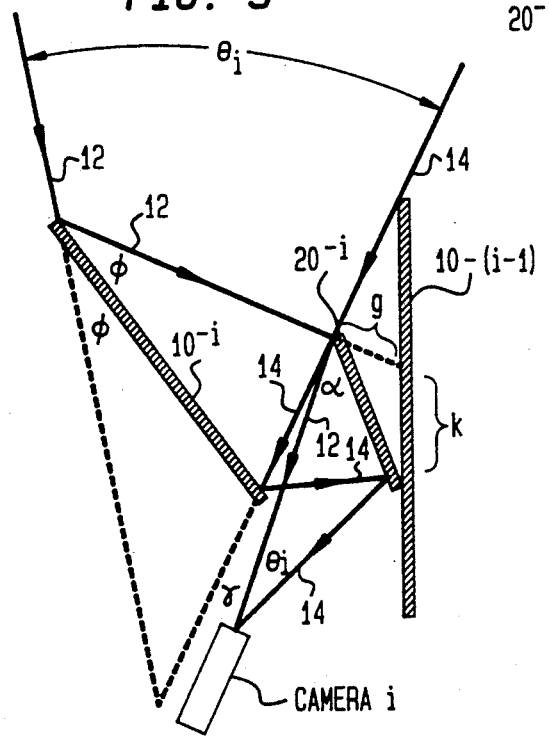
FIG. 3 illustrates one of the cameras and associated mirrors of FIG. 2 in greater detail.

The operation of the two mirrors associated with each camera may be understood in connection with FIG. 3.

FIG. 3 shows the mirrors 10-i and 20-i associated with the camera i. The field of view of the camera i is folded twice by the mirrors 10-i and 20-i to eliminate overall mirror inversion and to allow the various cameras to be physically separated in space as shown in FIG. 2.

In FIG. 3, the mirror 10-i is oriented at an angle with respect to the lefthand ray 12 entering the camera. As shown in FIG. 3, the ray 12 is reflected at the lefthand edge of the mirror 10-i and reflected again at the lefthand edge of the mirror 20-i before entering the camera i. The righthand ray 14 is reflected from the righthand edge of the mirror 10-i and reflected again at the righthand edge of the mirror 20-i before entering the camera i. The left and right hand rays 12 and 14 define the left and righthand boundaries of the field of view $\theta_i$ of the camera i.

The problem is to insure that the lefthand ray 12 does not intersect the first mirror 10-i a second time after reflection by the second mirror 20-i. A solution exists provided the angle $\gamma$ is positive. In particular, the first mirror 10-i does not interfere with the beam path coming off the second mirror, i.e. $\gamma$ is positive, when $$\alpha < \frac{0}{2} + \phi \tag{1}$$

where $\alpha$ is the angle between the ray 12 and the mirror 20-i after reflection from the mirror 20-i.

The angle $\alpha$ is fixed when the angles $\theta$ and $\phi$ are specified. In particular, the angle $\alpha$ is determined by $$\tan\alpha = \frac{\sin(0 + \phi)}{\frac{g}{k} + \cos(0 + \phi)} \tag{2}$$

where g and k are the sides of a triangle having the mirror 20-i as one side as shown in FIG. 3. As shown in FIG. 3, the side k is formed by part of the mirror 10-(i-1) associated with the preceding camera i-1 in the sequence (see FIG. 2).

There is a free scale factor which can be set to unity in which case $$g = \frac{\sin\phi}{\sin(0 + \phi)} \left(1 - \frac{\sin 2\phi}{\sin(0 + 2\phi)}\right), \tag{3}$$

$$k = \frac{\sin 0}{\sin(20 + \phi)} \left(1 - \frac{\sin 0}{\sin(0 + 2\phi)} - g\right)$$

Illustratively, when $\theta_i = 30°$, interference with the mirror 10-i is avoided with an angle $\phi$ up to 30°.

In the implementation of an array of cameras having contiguous fields of view as shown in FIGS. 2 and 3, the use of the second mirror 20-i associated with the camera i, provides a second inversion which compensates for the inversion caused by the first mirror 10-i. However, if the camera itself or the display device on which the image is displayed accomplishes an inversion, only one mirror may be utilized with each camera.

Figure 4:
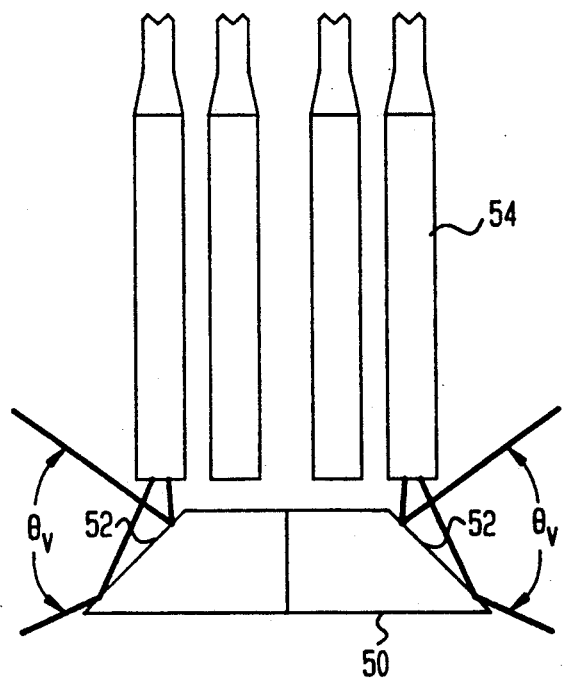
FIG. 4 and FIG. 5 illustrate an alternative optical system wherein a sequence of cameras is arranged so that the cameras have contiguous fields of view.
Figure 5:
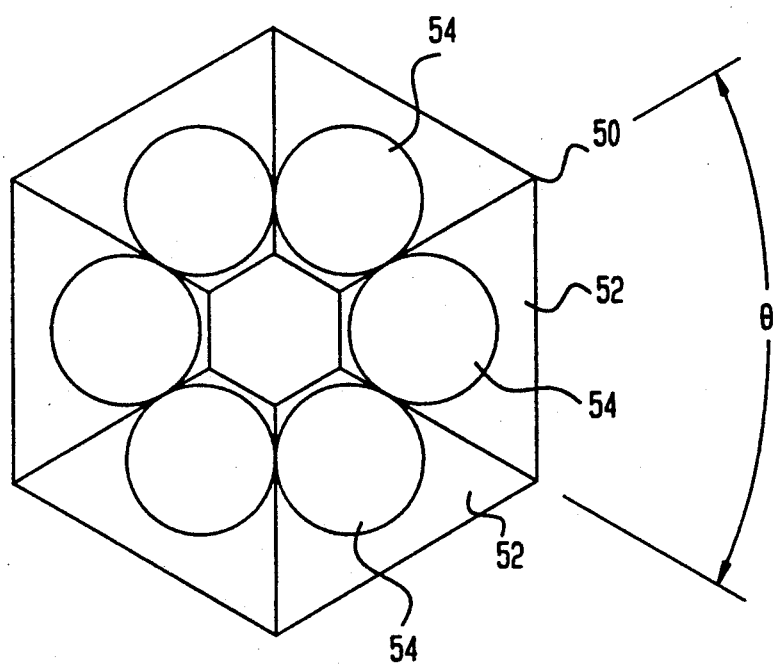

For example, if the scan reversal is accomplished electrically through the use of reverse scan cameras, then a very compact camera arrangement can be utilized to obtain the aggregate wide angle field of view. FIG. 4 shows a side view and FIG. 5 shows a top view of a six-sided pyramidal mirror 50. Each of the mirror sides 52 captures a field of view $\theta$ of an associated video camera 54 with scan reversal. In this manner a six camera arrangement with an aggregate field of view of substantially 360° may be achieved.

B. Display And Composition System

Section A above describes how a plurality of cameras, such as NTSC cameras, can be arranged so that the fields of view of adjacent cameras merge contiguously to form an aggregate wide angle field of view. Section B describes how a viewer can select an arbitrary and continuously variable section of the aggregate field of view, such as the subsection $\theta'$ of FIG. 2, and display a video image corresponding to the selected subsection of the aggregate field of view.

Figure 6:
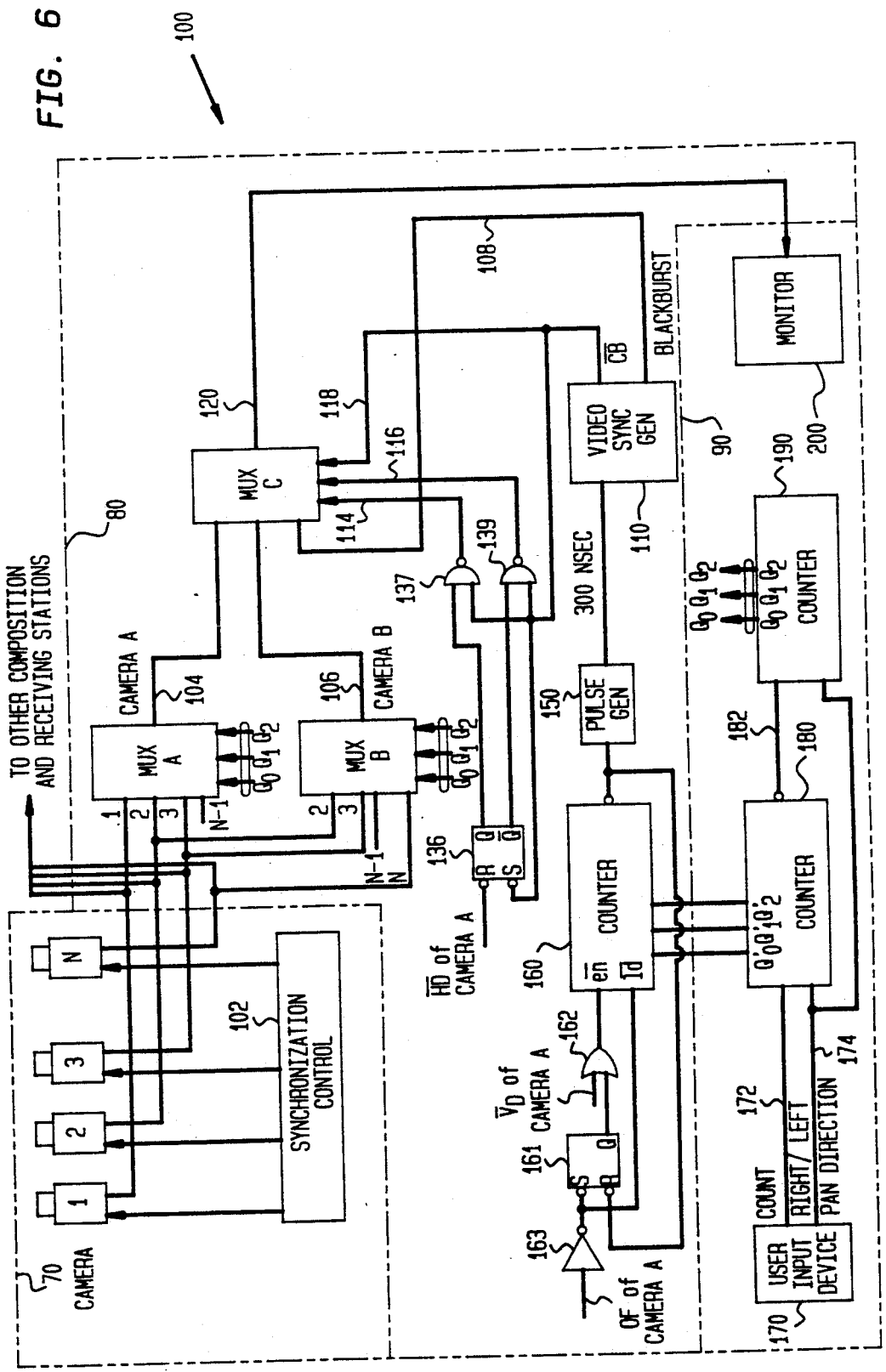
FIG. 6 schematically illustrates a system for selecting a section of the aggregate field of view of the cameras in FIG. 2 for display by a viewer on a local monitor, in accordance with the present invention.

A television system which enables a viewer to select an arbitrary subsection of a wide angle field of view is illustrated in FIG. 6. The television system 100 of FIG. 6 comprises a sending station 70, a composing station 80 and a receiving station 90. Physically, the composing station 80 may be located at the sending station 70, at the receiving station 90, or at a location separate from the sending station 70 and the receiving station 90 such as at a central office of a telecommunications network. The composing station is the location of the circuitry for composing a composite video signal corresponding to an arbitrary and variable section of the aggregate field of view of FIG. 2.

At the sending station 70, there is a sequence of cameras 1,2,...,N arranged as shown in FIG. 2, to have contiguously merging fields of view. At the receiving station 90, a monitor 200 displays an image corresponding to a section $\theta'$ (see FIG. 2) of the aggregate field of view formed by the cameras 1,2,...,N. Preferably, the viewer selected field of view $\theta'$ is equal in angular width to the field of view $\theta_i$ of an individual camera. Thus, $\theta$ comprises portions of at most two adjacent individual fields of view. For example, in FIG. 2, $\theta'$ comprises a portion of the field of view $\theta_1$ of camera 1 and a portion of the field of view $\theta_2$ of camera 2.

In FIG. 6, cameras 1,2,...,N at the sending station 70 are synchronized by a synchronization control circuit 102. The cameras are synchronized so that a horizontal line of displayable video of one camera ends just when a horizontal line of displayable video of the next adjacent camera begins.

Figure 7:
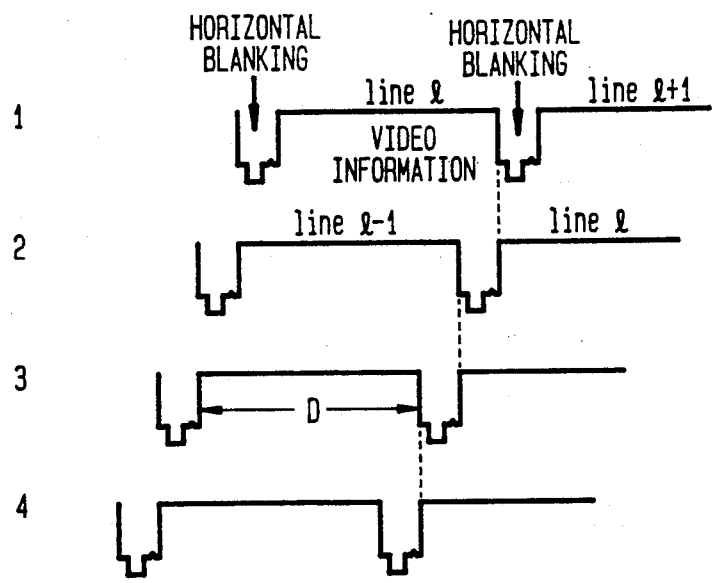
FIG. 7 shows how the cameras of FIG. 2 and FIG. 6 are synchronized.

FIG. 7 shows the synchronization relationship between the cameras 1,2,3,... In particular, FIG. 7 shows segments of the video signals generated by the video camera 1,2,3, and 4 of FIG. 6. Each segment of video signal comprises in a repetitive pattern a horizontal line of video information followed by a horizontal blanking interval. As can be seen in FIG. 7, a horizontal line 1 of information of one camera (e.g. camera 1) ends just at the beginning of a like-numbered horizontal line 1 of information of the next camera (e.g. camera 2).

Figure 8:
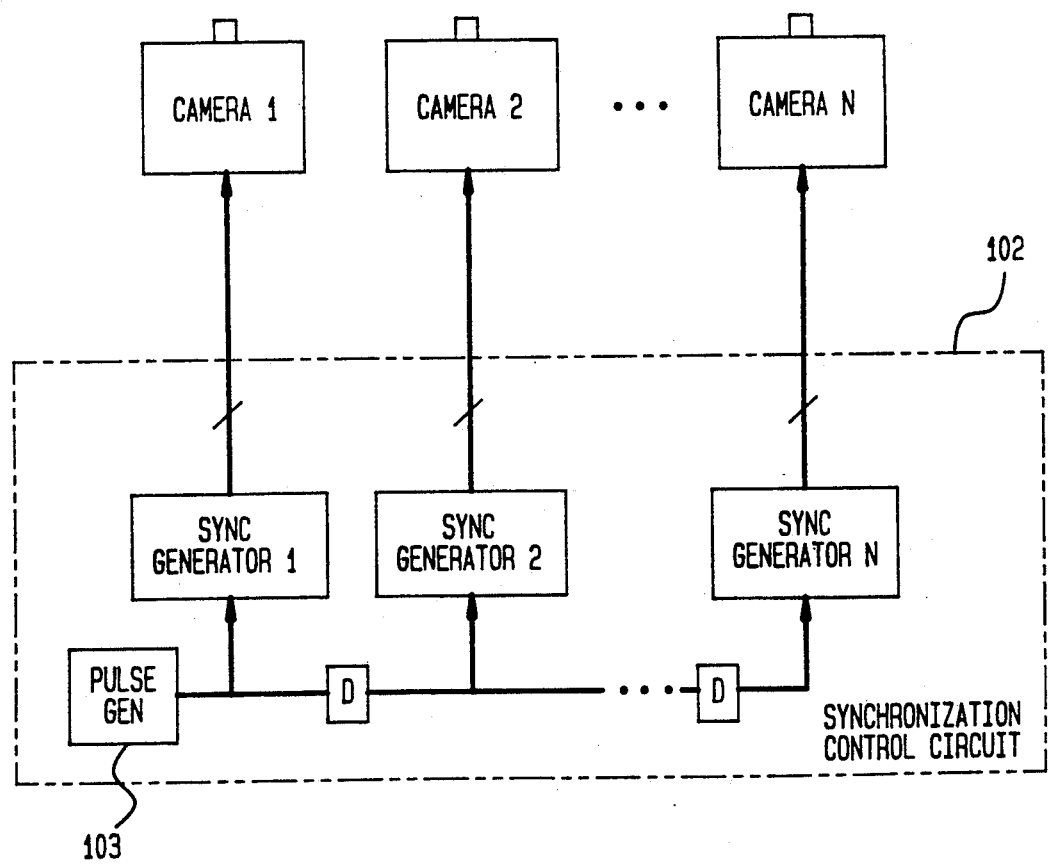
FIG. 8 schematically illustrates a synchronization control circuit utilized in the system of FIG. 6.

An illustrative embodiment of the synchronization control circuit 102 (see FIG. 6) is shown in FIG. 8. As shown in FIG. 8, the synchronization control circuit 102 comprises one sync generator for each video camera. Thus, corresponding to the video cameras 1,2,... ,N are the sync generators 1,2,...,N, respectively. Each sync generator outputs to its corresponding camera a plurality of synchronization signals such as horizontal timing, vertical timing and color subcarrier synchronization signals. The input to each sync generator is a sequence of pulses. These pulses are generated by a pulse generator 103. The input pulses for each successive sync generator shown in FIG. 8 are delayed by a delay D relative to the preceding sync generator in the sequence. Each delay D is equal to the duration of one horizontal line of video information. When this delay is utilized, the video signals generated by the cameras 1,2,3,...,N have the phase relationship shown in FIG. 7.

Returning now to FIG. 6, the video signals from the cameras 1,2,3, . . . ,N are transmitted to a plurality of composing stations such as the station 80 of FIG. 6. Illustratively in FIG. 2 the number of cameras N is chosen as 8 allowing the use of 3 binary select lines $Q_0$, $Q_1$, $Q_2$ as shown in FIG. 6 to select one among eight camera pairs. However, m select lines can be used to select any camera pair among $2^m+1$ cameras. In particular, the video signals from all but the last of the cameras at the sending station 70, i.e. the video signals from the cameras 1,2,3, . . . ,N−1, are transmitted to a first multiplexer at the composing station 80, which first multiplexer is designated herein as MUX A. The video signals from all but the first of the cameras at the sending station 70, i.e. the cameras 2,3, . . . ,N−1,N, are also transmitted to a second multiplexer at the composing station 80 designated herein as MUX B. Note that the input lines to the MUX A which receive the video signals are numbered 1,2,...,N−1 and that the input lines of MUX B which receive the video signals are numbered 2,3, . . . ,N−1,N. Both MUX A and MUX B receive the same set of user generated selection signals. This single set of selection signals $Q_0$, $Q_1$, $Q_2$ is generated at the receiver station 90 and serves to select the video signal from one camera, designated herein as camera A, on the output line 104 of MUX A and the video signal from the adjacent camera, designated herein as camera B, on the output line 106 of MUX B.

The video signal for camera A on line 104 and the video signal for camera B on line 106 are transmitted to a third multiplexer, designated herein as MUX C. Also transmitted to the MUX C on line 108 is a black burst generated by the video sync generator 110. The black burst contains all the components of a video signal including horizontal and vertical sync pulses and color burst but does not contain any video information. Thus, the MUX C receives the video signal from camera A on line 104, the video signal from camera B on line 106 and the black burst on line 108. The multiplexer C also receives three selection signals on lines 114, 116, and 118. The selection signal on 118 is a logic low during the composite blanking interval and is derived from the video sync generator 110. When the selection signals on lines 114, 116, 118 have the pattern LO, HI, HI, the video signal from camera A is transmitted to the output 120 of MUX C. When the selection signals on lines 114, 116, 118 have the pattern HI, LO, HI, the video signal of camera B is transmitted to the output 120 of MUX C. Similarly, when the selection signals on lines 114, 116, 118 have the pattern HI, HI, LO, the black burst is transmitted to the output 120. In this manner, the video signals from selected cameras A and B and the black burst are combined to form a composite video signal for display on the viewer monitor 200. The logic network used to generate the selection signals to the MUX C is discussed below.

At the composing station 80, the horizontal drive signal ($\overline{HD}$), the vertical drive signal ($\overline{VD}$) and the odd field signal OF of the selected camera A are recovered using conventional circuitry (not shown). The horizontal drive signal for camera A ($\overline{HD}$) is connected to the "R" input of the flip-flop 136. The "S" input of the flip-flop 136 receives the composite blanking signal ($\overline{CB}$) from the video sync generator 110. A first input of the NAND-gate 137 is connected to the Q output of the flip-flop 136 and a first input of the NAND-gate 139 is connected to the $\overline{Q}$ output of the flip-flop 136. The second input of the gate 137 and the second input of the NAND-gate 139 receive the composite blanking signal ($\overline{CB}$) of the video sync generator 110. The flip-flop 136 and the NAND gates 137 and 139 form a logic network which generates the selection signals on lines 114 and 116. As indicated previously, the selection signal on line 118 is the composite blanking signal ($\overline{CB}$) generated by the video sync generator 110.

Figure 9:
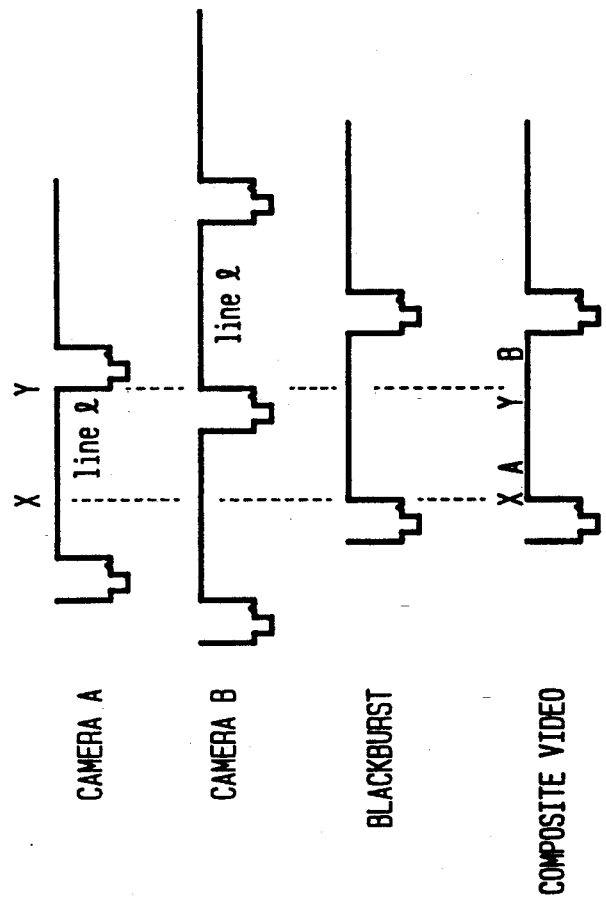
FIG. 9 shows the formation of a composite video signal corresponding to an arbitrarily chosen section of the aggregate field of view of the cameras of FIG. 2 and FIG. 6.

FIG. 9 illustrates the video signal of camera A, the video signal for camera B, the black burst and the composite output signal. As indicated previously, cameras A and B are synchronized so that a horizontal line 1 of displayable video information of camera A ends just at the start of a horizontal displayable video line 1 of camera B. The selection signals on lines 114, 116, and 118 are generated by the video sync generator 110 and logic elements 136, 137, and 139 so that the black burst is transmitted to the output 120 of the MUX C during the horizontal and vertical blanking intervals. Thus, the composite output video signal includes the horizontal blanking interval signals of the black burst. As shown in FIG. 9, the horizontal blanking interval of the black burst ends at a point in time x which is located in a horizontal line 1 of video for camera A. At this point, the selection signals of MUX C change so that the signal of camera A is transmitted to the output 120 of the MUX C. Thus from the point x to the end of the video line of camera A at point y, the video signal of camera A is used to form the composite output signal. At the end of the horizontal line of camera A at point y, the select signals change so that the video from camera B is transmitted to the output 120 of the MUX C. Thus the composite signal is now formed from the video signal for camera B. This continues until the start of the next horizontal blanking interval of the black burst. At this point, the selection signals of the MUX C change again so that the horizontal blanking interval signal of the black burst is transmitted to the output 120 of the MUX C. Thus the composite video output signal comprises the horizontal and vertical sync signals and color burst from the black burst, and each horizontal line in the composite video output signal is made up in part from the video of camera A and in part from the video of camera B.

Figure 10:
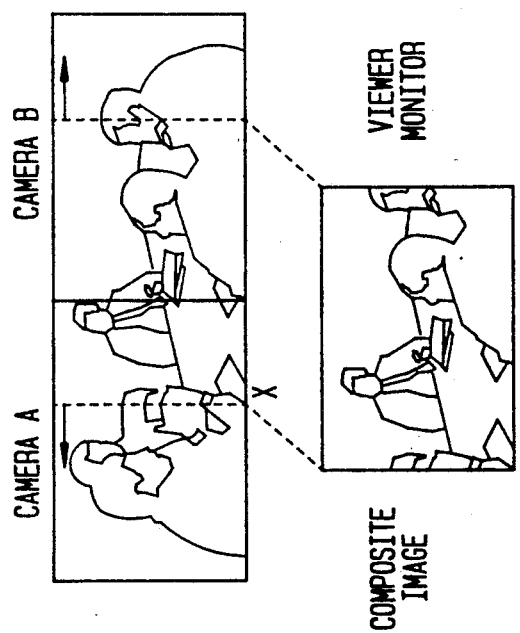
FIG. 10 shows an example of an image formed using a composite video signal of the type illustrated in FIG. 9.

The image which results from the composite video signal of FIG. 9 may be understood in connection with FIG 10. FIG. 10 shows the image that is produced by the video signal of camera A alone, the image that is produced by the video signal of camera B alone and the video image which is produced by the composite video signal. Note that the composite image has the same length as the video image of camera A and camera B as they all are NTSC images, and that the composite image starts at point x in the image of camera A.

As discussed previously, it is an object of the system 100 of FIG. 6 to display an arbitrary and continuously variable section $\theta'$ (see FIG. 2) of the aggregate field of view $\beta$ of the cameras 1,2, . . . N. To do this, the user needs to select two consecutive cameras from the sequence of cameras 1,2,3, . . . N and once the two cameras A and B are selected, choose a point x in the horizontal video line of the first camera at which the composite image is to start. As indicated previously, the cameras A and B are determined by the selection signals $Q_0$, $Q_1$, $Q_2$ generated at the receiving station 90. The generation of these signals is discussed below. The point x is determined by the timing of the pulses from the pulse generator 150. The pulse generator 150 illustratively generates 300 nsec wide pulses. The timing of these pulses determines the timing of the horizontal blanking signal of the black burst, i.e., the location of the horizontal blanking signal of the black burst relative to the video signal of camera A.

The timing of the pulses from the pulse generator 150 is determined by the count in the counter 160. The count in the counter 160 is determined as follows. The viewer who controls the receiving station 90 utilizes a user input device 170. Under the control of the viewer, the input device 170 outputs a sequence of pulses on line 172. Depending on the signal on line 174, the pulses on line 172 cause the count $Q'_0$, $Q'_1$, $Q'_2$ in the counter 180 to increase or decrease. Illustratively, view selection within a camera pair is shown with three binary signals $Q_0'$, $Q_1'$, $Q_2'$ allowing a total of eight selectable views. However, the number of selectable views can be increased to $2^m$ (for $m>3$) where m binary signals are transferred from the counter 180 to the counter 160. The count in the counter 180 is transferred to the counter 160 so as to control the timing of the pulses generated by the pulse generator 150 and thus control the location of the point x in FIGS. 9 and 10. The count is transferred from the counter 180 to the counter 160 in response to an OF pulse of camera A being transferred to the $\overline{\text{ld}}$ input of the counter 160 after inversion by the inverter 163.

Typically, the pulse generator 150 is required to deliver a pulse at a time which is delayed from the start of a new frame in camera A. A flip-flop 161 is set by the odd field (OF) pulse of camera A after inversion by the inverter 163 so that when the next vertical drive pulse ($\overline{\text{VD}}$) of camera A occurs, logical low level signal $\overline{V}_D$ can be passed through an OR-gate 162 to enable the counter 160. At that time the counter 160 counts downward from the count loaded from the counter 180 to zero. When the counter 160 reaches zero, the counter 160 outputs a signal to the pulse generator 150 and the pulse generator 150 in turn sends a 300 nsec pulse to the video sync generator 110. The flip-flop 161 is reset by the output signal of the counter 160.

Illustratively, if the count in the counter 180 is decreased, the point x is moved to the left, and if the count in the counter 180 is increased, the point x is moved to the right. In other words, if the count in the counter 180 is decreased, the image on the monitor 200 pans to the left and if the count in the counter 180 is increased the image on the monitor 200 pans to the right. If the count in the counter 180 remains constant, the field of view of the image on the monitor 200 remains the same.

Connected to the panning counter 180 of FIG. 6 is the camera selection counter 190. The counter 190 outputs the camera selection signals $Q_0$, $Q_1$, $Q_2$. The counter 190 receives the signal on line 174 which indicates whether it is to count up or count down. The camera selection signals $Q_0$, $Q_1$, $Q_2$ are generated as follows. When the viewer selects the count up direction and when the viewer generates so many pulses on line 172 that the panning counter 180 overflows, a signal is transmitted on line 182 from the panning counter 180 to the camera selection counter 190 causing the count in the camera selection counter 190 to increase by one. When the counter 180 reaches its maximum count, it means that the image on the monitor 200 has panned as far to the right as possible for the selected cameras A and B and to pan further to the right it is necessary to change the selected cameras by increasing the count in the counter 190 by one.

Similarly, when the viewer selects the count down direction and when the viewer generates so many pulses on line 172 that the counter 180 reaches zero, a signal is transmitted on line 180 to the counter 190 causing the count in the counter 190 to decrease by one. When the panning counter 180 reaches its minimum count, it means that the image on the monitor 200 has panned as far to the left as possible for the selected cameras A and B and to pan further to the left it is necessary to change the selected cameras by decreasing the count in the counter 190 by one.

CONCLUSION

A television system has been disclosed which enables a viewer to display on a local monitor an arbitrary and continuously variable subsection of a remotely located aggregate field of view formed by an array of cameras.

Finally, the above-described embodiments of the invention are intended to be illustrative only. Numerous alternative embodiments may be devised by those skilled in the art without departing from the spirit and scope of the following claims.

We claim:

1. A television system comprising
   a sending station comprising a sequence of cameras and means for optically arranging said cameras such that the individual fields of view of adjacent ones of said cameras merge contiguously to form an aggregate wide angle field of view,
   a composing station comprising means for generating a composite video signal for displaying an image of an arbitrary and continuously variable subsection of said aggregate wide angle field of view, and
   a receiving station comprising a monitor for displaying said image.

2. The television system of claim 1 wherein said sending station further comprises a synchronization control circuit for synchronizing said cameras so that a horizontal line of a video signal generated by one camera ends at the beginning of a horizontal line of a video signal generated by the next camera in said sequence.

3. The television system of claim 1 wherein said cameras are NTSC cameras and said monitor is an NTSC monitor.

4. The television system of claim 1 wherein said generating means comprises,
   first selection means for selecting first and second video signals produced by first and second cameras from said sequence, and
   second selection means for selecting a portion of said first video signal and a portion of said second video signal for forming said composite video signal.

5. A television system comprising
   a sending station comprising a sequence of cameras arranged so that the individual fields of view of adjacent ones of said cameras merge contiguously to form an aggregate wide angle field of view,
   a composing station comprising means for generating a composite video signal for displaying an image of an arbitrary and continuously variable subsection of said aggregate wide angle field of view, and
   a receiving station comprising a monitor for displaying said image, wherein said generating means comprises,
   first selection means for selecting first and second video signals produced by first and second cameras from said sequence, and second selection means for selecting a portion of said first video signal and a portion of said second video signal for forming said composite video signal, wherein said first selection means comprises first multiplexing means for receiving a video signal from all but the last of said cameras in said sequence and second multiplexing means for receiving a video signal from all but the first of said cameras in said sequence, and wherein said receiving station comprises a first counter for generating a selection signal for said first and second multiplexing means to output said first and second video signals, respectively.

6. The television system of claim 5 wherein said generating means further comprises a video sync generator for generating a black burst.

7. The television system of claim 6 wherein said generating means further comprises a third multiplexing means for multiplexing said selected portion of said first and second video signals of said first and second cameras and said black burst to form said composite video signal.

8. The television system of claim 7 wherein said generating means further comprises means for controlling the position of a horizontal blanking interval of said black burst relative to a line of video in said first video signal of said first camera.

9. The television system of claim 8 wherein said controlling means comprises a pulse generator for transmitting timing pulses to said video sync generator, and wherein said receiving station comprises a second counter for controlling the timing of said timing pulses relative to said first video signal of said first camera.

10. A composing station for use in a television system comprising
   means for receiving a video signal from each of a sequence of cameras arranged so that their individual fields of view merge contiguously to form an aggregate wide angle field of view, and
   means for generating from said received video signals a composite video signal for displaying on a display monitor an image of an arbitrary and continuously variable subsection of said aggregate field of view.

11. A composing station for use in a television system comprising
   means for receiving a video signal from each of a sequence of cameras arranged so that their individual fields of view merge contiguously to form an aggregate wide angle field of view, and
   means for generating from said received video signals a composite video signal for displaying on a display monitor an image of an arbitrary and continuously variable subsection of said aggregate field of view,
   wherein said generating means comprises
      means for selecting from said received video signals first and second video signals transmitted from first and second adjacent ones of said cameras,
      means for generating a black burst, and
      means for multiplexing selected portions of said first and second video signals and said black burst to form said composite video signal.

12. A television system comprising
   a sending station comprising a sequence of cameras arranged so that the individual fields of view of adjacent ones of said cameras merge contiguously to form an aggregate wide angle field of view,
   means for receiving video signals generated by said cameras and for generating one or more composite video signals, each composite video signal being formed from one or more of said received video signals and corresponding to an arbitrary and continuously variable subsection of said aggregate wide angle field of view, and
   one or more monitors for receiving one of said composite video signals and for displaying an image of a subsection of said aggregate field of view.

13. A television system comprising
   a sending station comprising a sequence of cameras arranged so that the individual fields of view of adjacent ones of said cameras merge contiguously to form an aggregated wide angle field of view,
   a composing station comprising means for generating a composite video signal for displaying an image of an arbitrary and continuously variable subsection of said aggregate wide angle field of view, and
   a receiving station comprising a monitor for displaying said image, wherein said sending station comprises first and second mirrors corresponding to each of said cameras, said first and second mirrors being positioned to fold the optical rays comprising the field of view of the corresponding camera such that there is sufficient room to mount said cameras at the common optical vertex.

14. An optical arrangement for contiguously merging image to form an aggregate wide angle field of view, comprising:
   a plurality of cameras, i, (i=1 to N), each of said plurality of cameras having a field of view $\theta_i$;
   a plurality of first mirrors, $j_i$; and
   a plurality of second mirrors, $k_i$, wherein each of said first and second mirrors, $j_i$ and $k_i$, respectively, correspond to one of said plurality of cameras, i, are positioned to fold the optical rays comprising the field of view of camera, i, such that there is enough room to mount said plurality of cameras at the common optical vertex, and wherein the field of view of each of said cameras merge contiguously with the fields of view of adjacent cameras so that the fields of view $\theta_i$ are combined to form an aggregate wide angle field of view.

15. The optical arrangement of claim 14 wherein a leftmost ray in the field of view $\theta$ of each of said plurality of cameras does not intersect said first mirror, $j_i$, a second time after being reflected by said second mirror, $k_i$.

16. An optical arrangement for contiguously merging images to form an aggregate wide angle field of view, comprising:
   a plurality of cameras, (i=1 to N), each having a field of view $\theta_i$; and
   a plurality of mirrors, $h_i$, wherein each of said mirrors, corresponds to one of said plurality of cameras, i, wherein each of said mirrors, $h_i$, is positioned to fold the optical rays comprising the field of view of camera, i, so that there is enough room to mount said plurality of cameras at the common optical vertex, and wherein the field of view of each of said cameras merge contiguously with the fields of view of adjacent camera so that the fields of view $\theta_i$ are combined to form an aggregate wide angle field of view.

17. The optical arrangement of claim 16 wherein each camera of said plurality of cameras inverts the image in its field of view.

* * * * *